United States Patent [19]

Lamberts

[11] 4,105,195

[45] Aug. 8, 1978

[54] GAS SPRING SUSPENSION SYSTEM FOR A VEHICLE SEAT

[75] Inventor: Ervins H. Lamberts, Hartwell, England

[73] Assignee: UOP Inc., Des Plaines, Ill.

[21] Appl. No.: 734,587

[22] Filed: Oct. 21, 1976

[30] Foreign Application Priority Data

Sep. 10, 1976 [GB] United Kingdom ............... 37621/76

[51] Int. Cl.² ............................................. A47C 7/14
[52] U.S. Cl. .................................. 267/131; 267/120; 248/400
[58] Field of Search ............... 267/131, 122, 113, 114, 267/120; 297/345, 340, 347; 248/157, 161, 400, 371, 396, 397, 398, 399; 91/384

[56] References Cited

U.S. PATENT DOCUMENTS

| 3,954,245 | 5/1976 | Costin | 248/400 |
| 4,022,411 | 5/1977 | Rumsey | 248/400 |

*Primary Examiner*—James B. Marbert

*Attorney, Agent, or Firm*—James R. Hoatson, Jr.; Barry L. Clark; William H. Page, II

[57] ABSTRACT

The gas spring suspension comprises a gas-tight container capable of longitudinal expansion and contraction and on which the seat is supported, a valve system for connecting the container selectively to a compressed gas source or to exhaust to raise or lower the vehicle seat, a telescopically slidable coupling connected at one end to one end of the gas spring and including a detent which locks the slidable parts of the coupling together at a selected relative position corresponding to a selected vehicle seat height and a mechanical spring coupling connected between the other end of the slidable coupling and the other end of the gas spring, the spring coupling being expandible and contractable between end stops which thereby limit the resilient expansion and contraction of the gas spring, at any selected seat height, means for releasing the detent prior to operation of the valve system, and means fo automatically terminating the inlet of compressed gas into the gas spring in response to the slidable coupling becoming fully extended.

10 Claims, 8 Drawing Figures

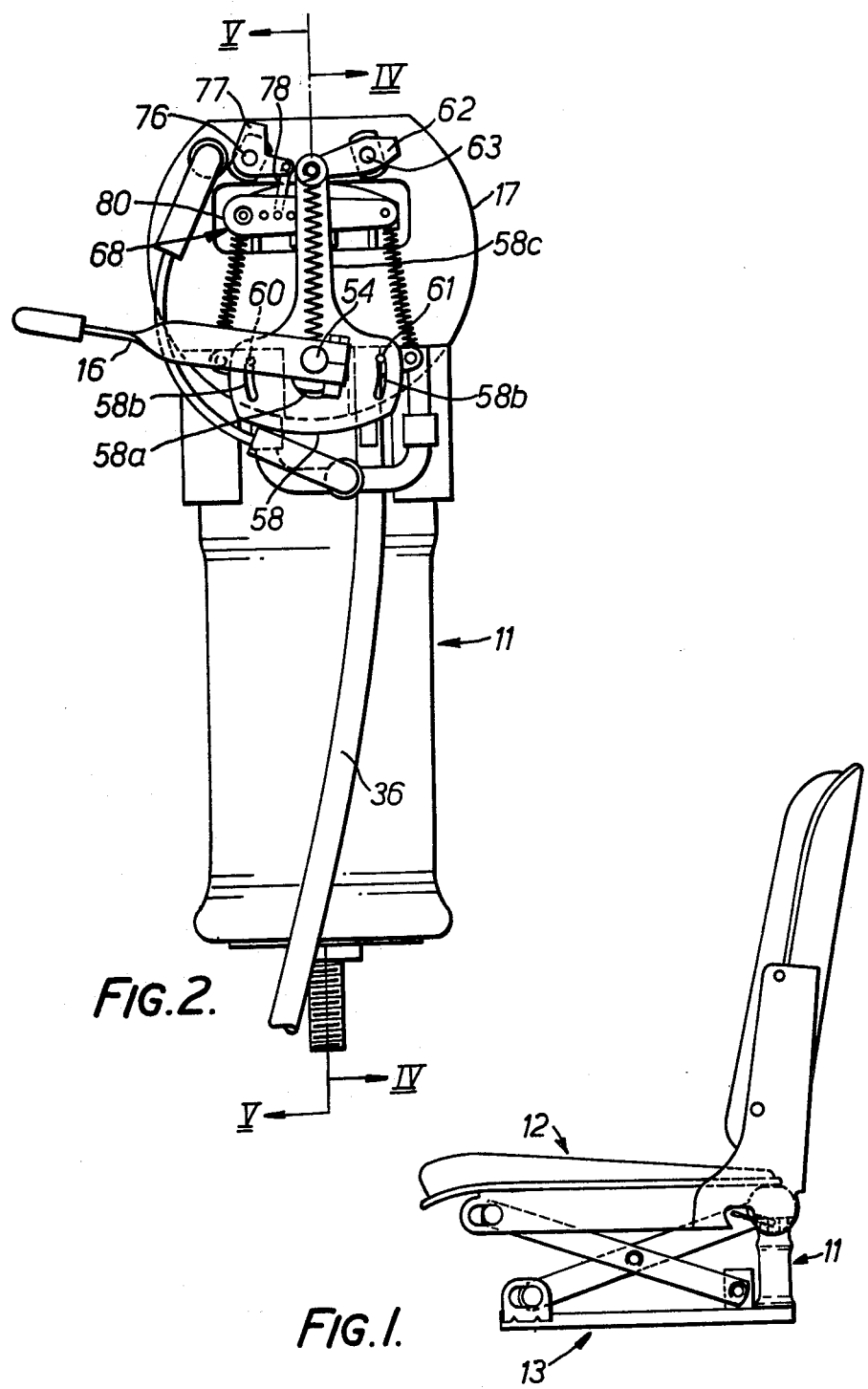

GAS SPRING SUSPENSION SYSTEM FOR A VEHICLE SEAT

This invention relates to a gas spring suspension system for a vehicle seat and a vehicle seat including such a suspension system.

According to the present invention there is provided a suspension system for a vehicle seat of the type comprising a seat part, a base part and guide means for guiding the seat part in upward and downward movement relative to the base part, the system comprising a gas spring for connection at its opposite ends to the base part and to the seat part respectively, the gas spring being capable of expansion and contraction in a direction between said opposite ends of the gas spring, valve means communicating with the interior of the gas spring and operable selectively to connect the gas spring with a source of compressed gas or with atmosphere in order to expand or contract the gas spring, and a height adjustment device comprising an abutment member connected via a height adjustment mechanism to one end of the gas spring and movable between a mutually spaced up-stop and down-stop secured to each other and to the other end of the gas spring, the stops being spaced apart along the direction of expansion and contraction of the spring, the abutment member being spring-biassed towards a predetermined position relative to and between said up-stop and down-stop, the mechanism comprising two support members slidable relatively to one another along said direction, one having apertures spaced apart therealong, the other having a detent thereon for engagement in any selected one of the apertures to lock the support members together, an operating handle and means connecting the operating handle to the height adjustment mechanism and to the valve means to release the support members for relative movement therebetween by withdrawing the detent from one of said apertures prior to operation of the valve means.

The present invention further provides a suspension system for a vehicle seat of the type comprising a seat part, a base part and guide means for guiding the seat part in upward and downward movement relative to the base part, the system comprising a gas spring for connection at one end to the base part and at its opposite end to the seat part, the gas spring being capable of expansion and contraction in a direction between said opposite ends of the gas spring, valve means communicating with the interior of the gas spring and operable selectively to connect the gas spring with a source of compressed gas or with atmosphere in order to expand or contract the gas spring, the valve means comprising three valves each of the type in which a valve closure member is biassed towards its closed position by a spring assisted by pressure on the high pressure side of the valve, a first one of said valves being connected on its lower pressure side to the low pressure side of a second of said valves, the high pressure side of the second valve and of a third valve being connected to the gas spring and the low pressure side of the third valve being connected to exhaust.

According to another feature, the present invention includes a valve device for use in controlling the flow of compressed gas into and out of a gas spring in a vehicle seat suspension system comprising three valves each of the type in which a valve closure member is biassed towards its closed position by a spring assisted by pressure on the high pressure side of the valve, a first one of said valves being connected on its low pressure side to the low pressure side of a second of said valves, the high pressure side of the second valve and of a third valve being connected to the gas spring and the low pressure side of the third valve being connected to exhaust.

The invention will now be described, by way of example, with reference to an air suspension system illustrated in the accompanying drawings in which:

FIG. 1 is a side elevation of a vehicle seat incorporating the air suspension system;

FIG. 2 is a diagrammatic end elevation of an air valve forming part of the air suspension system;

Figure 3:
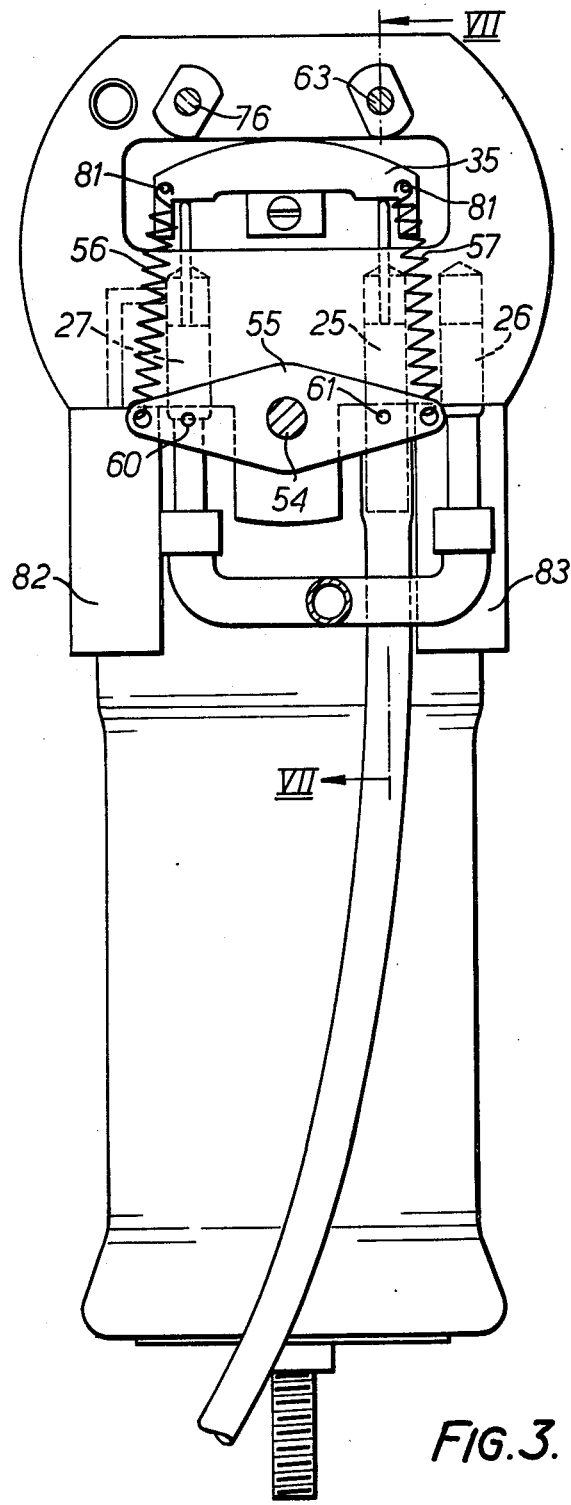
FIG. 3 is an end view corresponding to that of FIG. 2 but with certain parts removed to show the underlying construction.

As shown in the drawings, the basic components of the air suspension system comprise an air spring 11 for connection between the seat part 12 and the base part 13 of a vehicle seat to support resiliently the weight of the seat part and and the seat occupant; an air valve system 14 connected between the air spring and a source of compressed air carried by the vehicle and operable to introduce air into the air spring or allow air to be exhausted from the air spring, and a height adjustment device 15 operable by a lever 16 in cooperation with the air valve system to increase or decrease the volume of air in the air spring and thereby raise or lower the seat part relative to the base part. These components will now be considered in further detail.

The air suspension system includes a main housing 17 of generally cylindrical shape having, in one end, a compartment 18 forming a reservoir for air and, in its opposite end a compartment 20 in which the air valve system is housed. Between these two compartments, the housing is partially recessed and contains part of the height adjustment mechanism and the upper part of the air spring.

Figure 6:
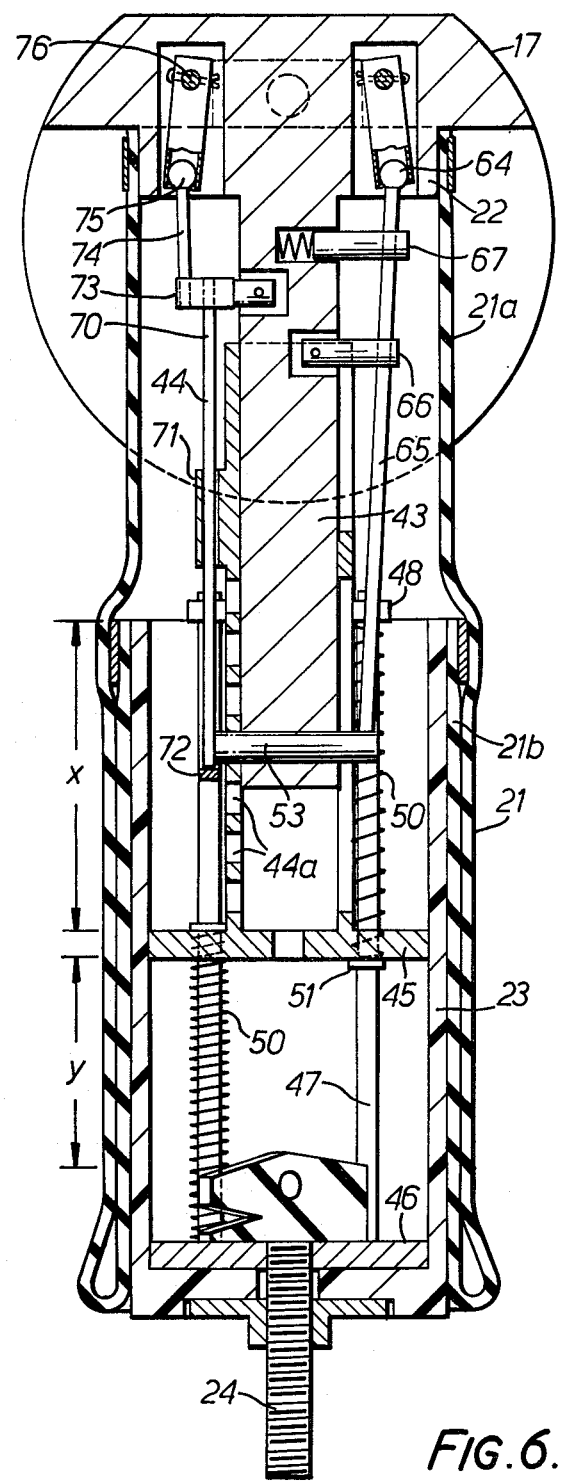
FIG. 6 is a section on the line VI—VI of FIG. 5.
Figure 7:
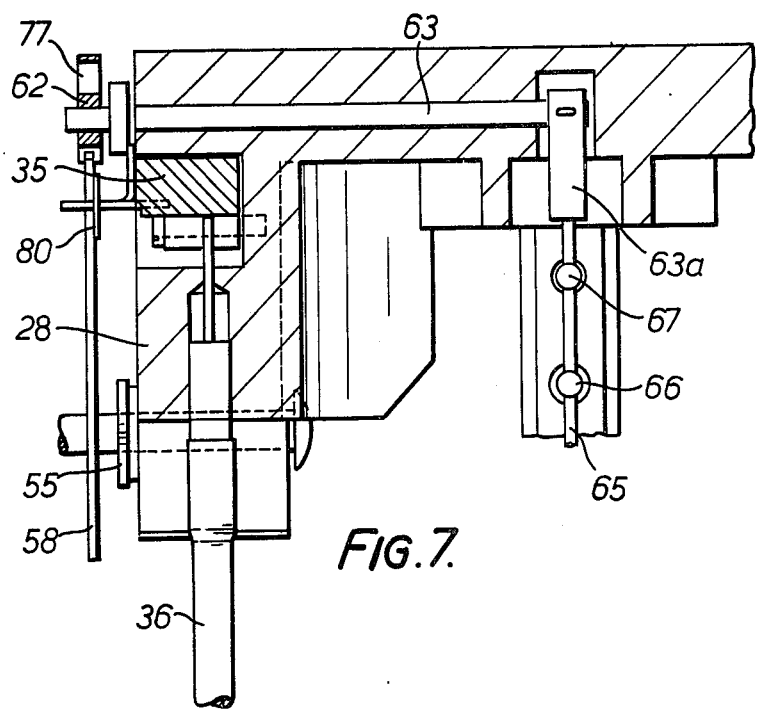
FIG. 7 is a section on the line VII—VII of FIG. 3.

The air spring (see FIG. 6) comprises a tubular rubber sleeve 21 the upper end portion 21a of which is sealed to a cylindrical cuff 22 forming an integral part of the housing 17. The lower end portion 21b of the sleeve is turned inwardly and upwardly and sealed to the upper end of a rigid elongate tubular cup 23 around which the sleeve is fitted. The base of the cup is connected by a bolt 24 to the base part 13 of the vehicle seat, whereas the housing is bolted to the seat part 12 so that as the volume of the air spring increases or decreases and hence the seat part rises or falls, the lower end portion 21b of the sleeve 21 rolls up or down the outside of the cup 23.

Figure 8:
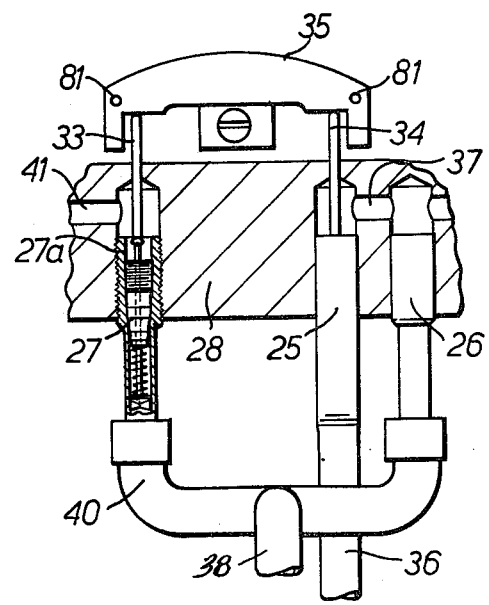
FIG. 8 is a view corresponding to the upper part of FIG. 3 but further cut-away to reveal the underlying parts.

The air valve system (see FIG. 8) comprises three separate poppet valve units 25, 26, 27 mounted in tubular recesses in a wall 28 of the housing 17. Each valve unit is of the type, commonly used in pneumatic tyres for vehicles, in which the valve can be opened either by the application of air pressure on the low pressure side of the valve to lift a valve member, such as 27a, away from its seating against the force of a spring, or by the direct application of force to the valve member through a pin such as 33 or 34 engaging at its inner end with the valve member and projecting at its opposite end axially out of the tubular valve recess. In this arrangement, the pressure of air on the high pressure side of the valve holds the valve member closed against its seat and thus flow through the valve from the high pressure side to the low pressure side is permitted only by depression of the valve pin to force the valve member away from its seating.

The two valve units 25 and 27 mounted in the housing have their valve pins aligned for engagement with the opposite ends of a valve-operating beam 35 which is pivoted in the housing to depress one pin when the beam is tilted in one direction and to depress the other pin when the lever is tilted in the opposite direction. Both pins are released and both valves are closed when the beam assumes a level or central position, as shown.

The first valve unit 25 is connected by a pipe 36 on its high pressure side to the supply of compressed air and serves, when closed, to seal the supply but to permit air to flow through the valve upon depression of the valve pin 34 by the beam 35 to open the valve. The low pressure side of the first valve unit 25 is directly connected by a conduit 37 to the low pressure side of the second valve unit 26 whose high pressure side is connected by a pipe 38 to the air spring of the seat. The air spring is also connected, by a pipe 40 which branches from the pipe 38 to the high pressure side of the third valve unit 27 whose low pressure side is connected by a conduit 41 to atmosphere.

In operation of the valve, it will be evident that tilting of the beam to depress the pin 34 of the first valve unit 25 will permit compressed air to flow from the supply pipe 36 through the first valve unit 25 into the low pressure side of the second valve unit 26, and this pressure will be sufficient to open the second valve unit 26 and allow the compressed air to flow into the air spring 11, causing the seat part 12 to rise. This will continue until the first valve unit 25 closes by a manually initiated movement of the beam back to its central position, or by automatic operation of an end stop mechanism to be described below.

If thereafter the beam is moved in the opposite direction to depress the pin 33 of the third valve unit 27, the air spring will be exhausted through the third valve unit to atmosphere and the seat part will fall. In a similar way this will continue until the third valve unit 27 closes either by a manually initiated movement of the beam back to its central position or by automatic operation of the end stop mechanism.

Figure 4:
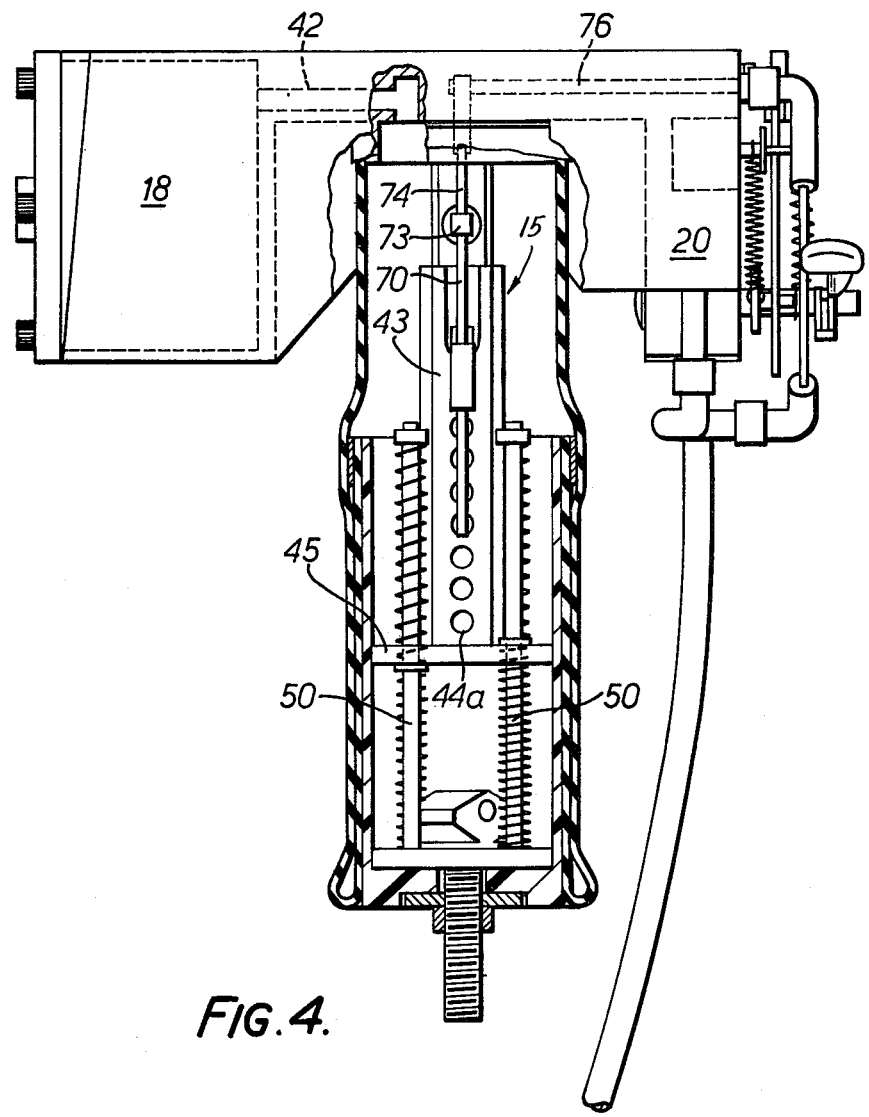
FIGS. 4 and 5 are vertical sections, part in elevation, through the air suspension system on the lines IV—IV and V—V of FIG. 2.

The volume of the air spring consists of the volume of the space within the cup 23 and the rubber sleeve 21, which is variable, and the volume of the air reservoir compartment 18 and the passage 42 (FIG. 4) connecting it to the interior of the sleeve. The volume of this reservoir compartment can be varied by inserting or removing filler members to adjust the total volume of the air spring to give the desired spring characteristic.

The height adjustment mechanism comprises a rigid column 43, for example of square section, mounted on the axis of the rubber sleeve and secured at its upper end to the housing, and a rigid skeletal sleeve 44 fitted around and normally secured to the column but slidably along the column when desired, as described below. The lower end of the skeletal sleeve 44 supports a plate 45 perpendicular to the axis of the sleeve. A second plate 46 is mounted parallel to the first plate 45 and is connected thereto by a plurality of equidistantly spaced rods 47 (for example four) rigidly secured at one end to the second plate 46 and extending through apertures in the first plate, the free ends of the rods carrying stop members 48. Each rod carries a helical tension spring 50, each spring being secured at one end to an end of the rod and at its opposite end to a collar 51 located on the opposite side of the first plate to the spring. An equal number of such springs are arranged on opposite sides of the first plate and are evenly spaced apart. The arrangement is such that the second plate is normally held resiliently by the opposing forces of the tension springs in a predetermined neutral position relative to the first plate. However the second plate 46 is movable away from the first plate 45, against the tensional force of the springs through a distance $x$ (see FIG. 6) equal to that between the first plate 45 and the end stops 48 of the rods when in the neutral position, and is movable towards the first plate, against the tensional force of the springs located between the first plate and the end stops of the rods, through a distance $y$ equal to that between the first plate and the neutral position of a rubber stop 52 mounted on the second plate 46. The distance $x + y$ is thus the maximum permissible stroke of the air spring at any selected height position of the seat.

In order to vary the height of the seat, the skeletal sleeve 44 is formed with a longitudinally spaced series of apertures 44a on one side of the sleeve, and a pin-shaped detent 53 is slidably mounted, in an aperture in the column transverse to the longitudinal axis of the column, for movement into or out of any selected one of the apertures 44a of the sleeve. Accordingly the sleeve can be locked to the column at any one of a plurality of different positions each corresponding to a different height of the seat part 12 relative to the base part 13 of the seat. Moreover, by withdrawing the detent 53 from an aperture 44a of the sleeve, and allowing compressed air to flow into or out of the air spring, the seat part can be raised or lowered to a new height position established by reinserting the detent in an aperture 44a of the sleeve at the newly selected height position. The mechanism for withdrawing and reinserting the detent will now be considered.

Referring in particular to FIG. 2, it will be seen that the actuating lever 16 for the system is rigidly secured to a shaft 54 on which a double-arm lever 55 (FIG. 3) is also rigidly secured. The opposite ends of the double-arm lever 55 are connected respectively by torsion springs 56, 57 to the opposite ends of the air valve beam 35. The arrangement is such that upon moving the actuating lever 16 up or down, the resulting movement of the double-arm lever 55 transmitted via the springs 56, 57 tilts the beam and operates one or other of the valves 25, 27 to connect the air spring 11 respectively to the compressed air source or to exhaust.

Figure 5:
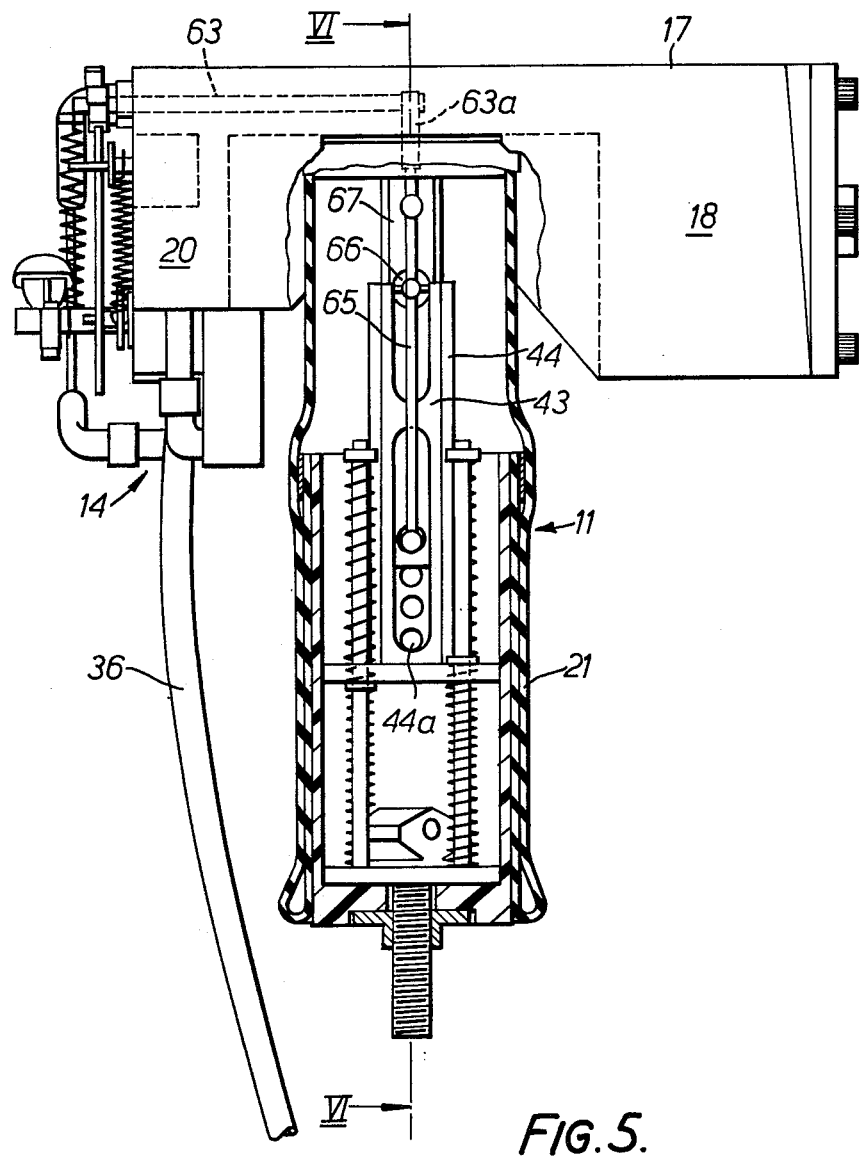

Located between the operating lever 16 and the double-arm lever 55 is a height-adjuster plate 58 having a central oversized aperture 58a through which the shaft 54 extends, and two slots 58b which are arcuate about the shaft and into which extend pins 60, 61 projecting from the respective arms of the double-arm lever 55, the pins normally engaging the upper ends of the slots 58b. A stem 58c extending from the main part of the plate 58 is pivoted at its outer end to the outer end of an arm 62 extending radially from one end of a height adjuster shaft 63 (see FIG. 5) journalled and sealed in the housing, the opposite end portion 63a of the shaft being cranked. The free end of the cranked shaft connected by a pivot 64 is pivoted to one end of a rod 65, the opposite end of which supports the detent 53, and at a point intermediate its ends the rod 65 is supported on a rocker member 66 pivoted to the column 43 of the height adjuster mechanism. The end of the rod 65 adjacent the cranked shaft is connected to a spring-biassed plunger 67 housed in the column 43 and acting to urge this end of the rod away from the column and so urge the detent towards the column and into one of the apertures 44a of the sleeve 44.

In operation of the height adjuster mechanism, lifting of the actuating lever 16 causes clockwise movement of the pin 60 of the double-arm lever to lift the height adjuster plate 58 and thereby rotate the height adjuster shaft 63 to tilt the rod 65 and withdraw the detent 53 to release the height adjuster sleeve 44 from the column 43 just before the spring 57 connecting one end of the double-arm lever 55 to the air valve beam 35 tilts the beam 35 and opens the first air valve unit 25. So long as the actuating lever is held in its raised position, the interconnecting linkage will hold the detent in its withdrawn position to enable the seat part to move upwardly in accordance with the increase of air pressure within the air spring to a new height position.

In a similar manner, depression of the actuating lever 16 causes anti-clockwise movement of pin 61 of the double-arm lever to lift the height adjuster plate and via the interconnecting coupling to release the height adjuster sleeve 44 from the column 43 just before the spring 56 tilts the beam 35 to open the third air valve 27 to exhaust the air spring.

Upon release of the lever 16, after movement in either direction the spring biassed plunger 67 acting on the rod will urge the detent toward the series of apertures 44a of the sleeve 44 and if such an aperture lies opposite the detent, the detent will enter such aperture. If however the detent engages the sleeve between apertures, the height adjuster shaft and hence the plate will not return fully to their initial positions and consequently the air valve beam 35 will not allow the operative valve to close fully. The continued flow of compressed air through the valve will therefore allow the height adjuster mechanism to move further until the detent drops into the next adjacent aperture in its direction of movement, whereupon the consequent rotation of the height adjuster shaft 63 will allow the plate 58, double-arm lever 55 and air valve beam 35 to return to their normal positions and so allow the valve to close.

In order to prevent overloading the air spring with compressed air in the event that the actuating lever is maintained in its depressed position after the height adjuster has reached the end of its travel, an over-ride safety device 68 (FIG. 2) is provided for automatically closing the air valve.

This over-ride device comprises a rod 70 (FIG. 6) mounted on the opposite side of the height adjuster column for longitudinal sliding movement in a guide 71 fixed to the sleeve of the height adjuster. A stop 72 is provided on the rod adjacent its lower end to contact the guide at the upper end of the travel of the height adjuster, the terminal position of the sleeve 44 being a position in which the detent 53 can engage an aperture 44a in the sleeve.

The upper end of the rod 70 is pivoted on a rocker 73 and also pivoted to one end of a coupling rod 74, the opposite end of the coupling rod being connected by a pivot 75 to the cranked end of an over-ride shaft 76 journalled and sealed in the housing 17 parallel to the height adjuster shaft 63. The opposite end of the over-ride shaft carries a radial arm 77 whose outer end is connected by a coupling rod 78 to a selected point on an over-ride beam 80. The over-ride beam lies parallel to and is carried on pins 81 projecting from the opposite ends of air valve beam 35 and is movable, by operation of the over-ride device, to tilt the air valve beam back to its level position against the force of the biassing spring 57 which is under tension from the raised actuating lever 16. Some lost-motion is provided for in the connection between the adjacent ends of the over-ride beam 80 and the air valve beam 35 which are closest to the coupling rod 78 of the over-ride device to prevent the over-ride device from interfering with normal operation of the air valve beam.

In order to give an audible indication to the occupant of the seat when the air valve is operating, two whistles 82, 83 (FIG. 3) are provided, each with a different warning note, one being connected to receive a bleed of compressed air from an air duct connecting the inlet valve 25 to the air spring, and the other connected to the exhaust side of the third air valve 27.

In operation of the air-suspension system, the occupant of the seat wishing to raise the height of the seat will lift the actuating lever 16 thereby tilting the double arm lever 55, in a clockwise direction in FIG. 3, to cause the pin 60 on the left hand side of the lever to engage the upper end of the left hand slot 58b in the plate 58 thereby lifting the plate to rotate the height adjuster shaft 63 and so withdraw the detent 53 to release the sleeve 44 from the column 43 of the height adjuster. Tilting movement of the double-arm lever 55 will also tension the spring 57 connecting this lever to the air valve beam 35 and cause the beam to tilt and open the air valve 25 immediately after release of the height adjuster sleeve. Compressed air flowing through the open air valve into the air spring will raise the level of the seat, and the height adjuster column will slide upwardly with the height adjuster sleeve.

Upon release of the actuating lever 16, the sprung detent on the column will slip into the aperture of the sleeve opposite or just above the detent at the moment of release of the lever, and the air valve beam 35 will be returned to its level position by the force of the springs acting on it. If however the operating lever is held in the raised position, the over-ride device will operate, as described above, to return the air-valve beam to its level position and close the air valve 25.

Depression of the operating lever will operate the height adjuster and air valve 27 in a converse sense to allow air to exhaust from the air spring and lower the seat.

Under static load conditions, the tension springs 50 acting between the two plates 45, 46 within the air spring will hold the first plate 45 at a desired position, for example approximately mid-way between the ends of the rods 47. However, under dynamic load conditions, upward or downward resilient movement of the seat relative to the base will take place under the control of the air spring through a stroke of up to, for example, 50 millimeters on each side of the ride position, the springs 50 yielding resiliently during this movement.

I claim:

1. A suspension system for a vehicle seat of the type comprising a seat part, a base part and guide means for guiding the seat part in upward and downward movement relative to the base part, the system comprising a gas spring having opposite ends for connection to the base part and to the seat part respectively, the gas spring being capable of expansion and contraction in a direction between said opposite ends of the gas spring, valve means communicating with the gas spring and operable selectively to connect the gas spring with a source of compressed gas or with atmosphere in order to expand or contract the gas spring, and a height adjustment device positioned internally of said gas spring comprising an abutment member, a height adjustment mechanism connecting said abutment member to one end of the gas spring, an up-stop, a down-stop spaced from said up-stop along the direction of expansion and contraction of the spring, means securing the up-stop and down-stop to each other and to the other end of the gas spring, said mechanism being movable between the spaced up-stop and down-stop, spring means biassing the abutment member towards a predetermined position relative to and between said up-stop and down-stop, the mechanism comprising two support members slidable relatively to one another along said direction, one support member having apertures spaced apart therealong, a detent on the other support member for engagement in any selected one of the apertures to lock the support members together, an operating handle and means connecting the operating handle to the height adjustment mechanism and to the valve means to release the support members for relative movement therebetween by withdrawing the detent from one of said apertures prior to operation of the valve means.

2. A system according to claim 1 wherein said valve means comprise three valves each of the type in which a valve closure member is biassed towards its closed position by a spring assisted by pressure on the high pressure side of the valve, a first one of said valves being connected on its low pressure side to the low pressure side of a second of said valves, the high pressure side of the second valve and of a third valve being connected to the gas spring and the low pressure side of the third valve being connected to exhaust.

3. A system according to claim 2 having valve operating pins connected respectively to the valve closure members of the first and third valves and a valve-operating beam mounted on a pivot and connected at positions, on opposite sides of the pivot, to the valve pins for operation of the first and third valves alternately.

4. A system according to claim 3 wherein the handle is connected to the valve-operating beam via a resilient coupling.

5. A system according to claim 4 having a safety device for preventing excessive inflation of the gas spring comprising an actuator movable in response to the gas spring reaching its fully inflated state, and a safety coupling connecting the actuator to the valve-operating beam and operable, in response to movement of the actuator, to return the valve-operating beam to a position in which it closes the first valve to shut off the compressed gas supply against the force of the resilient coupling between the handle and the valve-operating beam.

6. A system according to claim 1 wherein said abutment member is a plate and said stops are provided by abutments at opposite ends of a set of parallel rods which rods extend through apertures in the plate in a direction normal to the plate.

7. A system according to claim 6 having tension springs extending between the said stops and said plate, to spring-bias the plate to a position approximately mid-way between the up-stop and down-stop.

8. A system according to claim 7 wherein each tension spring surrounds a said rod, passes through the aperture containing the associated rod, and is connected at its extremity to a collar which is seated against the plate, the collar being releasable from the plate when the spring tension has been removed thereby allowing the plate to traverse the full distance between the up-stop and down-stop.

9. A suspension system for a vehicle seat of the type comprising a seat part, a base part and guide means for guiding the seat part in upward and downward movement relative to the base part, the system comprising a gas spring having opposite ends for connection to the base part and to the seat part respectively, the gas spring being capable of longitudinal expansion and contraction, valve means communicating with the gas spring and operable selectively to connect the gas spring with a source of compressed gas or with atmosphere in order to expand or contract the gas spring, and a height adjustment device comprising two relatively slidable parts positioned internally of said gas spring, one of which is secured to one end of the gas spring, a locking device positioned internally of said gas spring for locking the relatively slidable parts together at a selected seat height, a spring coupling connecting the other of the slidable parts to the other end of the gas spring, end stops positioned internally of said gas spring and between which the spring coupling is expandible and contractable and which thereby limit the resilient expansion and contraction of the gas spring at any selected seat height, and means for releasing the locking device prior to operation of the valve means.

10. A system according to claim 9 wherein said gas spring comprises a sleeve-shaped flexible member folded inwardly at one end, said end being fitted and secured around the outside of a cup-shaped member, the height adjustment mechanism being housed within the gas spring, the down-stop being formed by or attached to the base of the cup-shaped member.

* * * * *